US008495249B2

(12) United States Patent
Limont et al.

(10) Patent No.: US 8,495,249 B2
(45) Date of Patent: *Jul. 23, 2013

(54) PROVIDING SYNC NOTIFICATIONS TO CLIENT DEVICES

(71) Applicant: Microsoft Corporation, Redmond, WA (US)

(72) Inventors: David Paul Limont, Seattle, WA (US); Srinivasa R. Manda, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,415

(22) Filed: Oct. 1, 2012

(65) Prior Publication Data

US 2013/0031272 A1 Jan. 31, 2013

Related U.S. Application Data

(63) Continuation of application No. 13/039,134, filed on Mar. 2, 2011, now Pat. No. 8,307,034, which is a continuation of application No. 10/719,866, filed on Nov. 21, 2003, now Pat. No. 7,925,754.

(51) Int. Cl.
G06F 15/16 (2006.01)
G06F 15/173 (2006.01)

(52) U.S. Cl.
USPC ........... 709/248; 709/204; 709/217; 709/223; 709/224

(58) Field of Classification Search
None
See application file for complete search history.

(56) References Cited

U.S. PATENT DOCUMENTS

| 6,064,646 | A | 5/2000 | Shal et al. |
|---|---|---|---|
| 6,088,717 | A | 7/2000 | Reed et al. |
| 6,295,541 | B1 | 9/2001 | Bodnar et al. |
| 6,487,560 | B1 | 11/2002 | LaRue et al. |
| 6,505,200 | B1 | 1/2003 | Ims et al. |
| 6,510,439 | B1 | 1/2003 | Rangarajan et al. |
| 6,823,373 | B1 | 11/2004 | Pancha et al. |
| 6,882,659 | B1 | 4/2005 | Novak et al. |
| 6,886,044 | B1 | 4/2005 | Miles et al. |
| 7,000,032 | B2 | 2/2006 | Kloba et al. |
| 7,030,308 | B2 | 4/2006 | Yagi |
| 7,139,748 | B1 | 11/2006 | Mills et al. |
| 7,224,775 | B1 | 5/2007 | Shaffer et al. |

(Continued)

FOREIGN PATENT DOCUMENTS

| EP | 1 271 320 A1 | 1/2003 |
|---|---|---|
| JP | 10-013460 | 1/1998 |

(Continued)

*Primary Examiner* — Umar Cheema
(74) *Attorney, Agent, or Firm* — Senniger Powers LLP

(57) ABSTRACT

Providing synchronization notifications to a client device. In response to a server receiving notification that an event of interest has been received, a state of the client device is determined. The state indicates whether or not the client device has any outstanding sync notifications. In an embodiment, the state is determined based on a first parameter and a second parameter. When the state of the client device indicates that the client device has no outstanding sync notifications prior to the receipt the received notification, the first parameter is set equal to the second parameter, and the second parameter is updated after each successful device synchronization of the client device. A filter is applied prior to sending out the sync notification to the client device.

17 Claims, 4 Drawing Sheets

U.S. PATENT DOCUMENTS

| | | |
|---|---|---|
| 7,925,754 B2 | 4/2011 | Limont et al. |
| 2001/0049613 A1 | 12/2001 | Gramann, III et al. |
| 2001/0052052 A1 | 12/2001 | Peng |
| 2002/0029227 A1 | 3/2002 | Multer et al. |
| 2002/0046296 A1 | 4/2002 | Kloba et al. |
| 2002/0071436 A1* | 6/2002 | Border et al. ............ 370/395.32 |
| 2002/0095454 A1* | 7/2002 | Reed et al. .................... 709/201 |
| 2002/0120638 A1 | 8/2002 | Boehmke |
| 2003/0004917 A1* | 1/2003 | Thomas et al. .................... 707/1 |
| 2003/0014499 A1 | 1/2003 | Mighdoll et al. |
| 2003/0055825 A1 | 3/2003 | Chen et al. |
| 2003/0106022 A1 | 6/2003 | Goodacre et al. |
| 2003/0154254 A1 | 8/2003 | Awasthi |
| 2003/0163538 A1 | 8/2003 | Yeh et al. |
| 2004/0079220 A1 | 4/2004 | Yagi |
| 2005/0086306 A1* | 4/2005 | Lemke .......................... 709/206 |
| 2005/0211785 A1 | 9/2005 | Ferber et al. |
| 2006/0195556 A1 | 8/2006 | Shamia et al. |
| 2008/0211654 A1 | 9/2008 | Kasamatsu |
| 2010/0098069 A1 | 4/2010 | Samarasinghe |

FOREIGN PATENT DOCUMENTS

| | | |
|---|---|---|
| JP | 2002-111707 | 4/2002 |
| WO | 00/67105 A1 | 11/2000 |
| WO | 03/083667 A1 | 10/2003 |

* cited by examiner

PROVIDING SYNC NOTIFICATIONS TO CLIENT DEVICES

CROSS-REFERENCE TO RELATED APPLICATION

This application is a continuation of U.S. patent application Ser. No. 10/719,866, filed Nov. 21, 2003, and U.S. patent application Ser. No. 13/039,134, filed Mar. 2, 2011, the entire contents of which are incorporated herein by reference

BACKGROUND

Aspects of the invention relate generally to computer-based notification systems and, more particularly, relate to methods and systems to notify a user of events of interest to the user.

With the development and deployment of mobile devices such as laptop computers, personal digital assistant devices, cell phones, etc. and infrastructures, consumers and businesses are increasingly being able to realize the benefits of true mobile computing, collaboration, and information exchange. No longer are business travelers required to carry an assortment of cables and search endlessly for an available data port simply to connect to a network to retrieve email messages, download files, or exchange information. No longer are companies and home consumers restrained in where they may access their networks by the location of the Ethernet jacks on the wall. Meeting participants and groups of friends may now form their own ad hoc networks without connecting cables between themselves or logging in to some preexisting network. They can log onto the network using a wireless protocol while running on battery power, thereby allowing even greater mobility.

Hand-in-hand with mobile devices, electronic messaging such as electronic mail ("e-mail") and instant messaging carried over the Internet, is rapidly becoming not only quite pervasive in society but also, given its informality, ease of use and low cost, a preferred method of communication for many individuals and organizations. However, electronic messaging requires the users of the mobile devices to be within the range of the wireless networks they are on or subscribe to in order to receive messages. When users come back in the network after being out of range or when first logging in, the users often want to know if there are any messages waiting. Additionally, many users want to be notified when an event of interest occurs such as a particular message arriving, news of an event (e.g., calendar update), etc. so that the users can connect with the server of the network and retrieve the message/event/etc.

The most straightforward way to ensure that a user is kept in sync with a server is to send a sync notification (e.g., a ping) to the client whenever an event of interest occurs on the server. The client then connects back to the server to retrieve the data. This methodology requires a large number of notifications, which in turn consumes additional server CPU cycles, network bandwidth and battery life on the client. In today's network environments where users of a network are charged based upon time of day, length of time, and/or bandwidth usage, the notifications can increase the cost for the user. For example, where notifications are delivered over SMS (Short Messaging Service), this approach can significantly increase a user's monthly bill and waste carrier resources.

Industry has taken some steps to mitigate the cost of notifications. Some mitigations include waiting for a certain amount of time to elapse or a certain number of items to accumulate before sending the notification. However, all such approaches introduce latency into the system that does not have to be there. These approaches make a user wait five to ten minutes or longer for their email when the user can get it right away.

SUMMARY

Aspects of the invention maintain a notion of the state of the mobile device, indicating whether it is up to date or not from the perspective of the server. When an event occurs that is of interest to the mobile device, the server refers to the stored state to decide whether or not the device needs to be prompted to sync.

In one aspect, a method to provide a sync notification to a client device is provided. The method includes receiving, by a server, an event notification that an event of interest has been received, and in response to the server receiving the notification, determining a state of the client device. The state indicating whether or not the client device has an outstanding sync notification, where the state is determined based on a first parameter and a second parameter. Further, in response to the state of the client device indicating that the client device has no outstanding sync notifications prior to the receipt of the received event notification, the method includes setting the first parameter equal to the second parameter, such that the second parameter is updated after each successful device synchronization of the client device. The method further includes applying a filter to the sync notification prior to sending the sync notification to the client device. Sending the sync notification to the client device includes one of the following actions as selected by the applied filter: sending the sync notification immediately, sending the sync notification after a next timeout event, and sending the sync notification during a specific time period.

In another aspect, a system is provided that includes at least one computer readable storage medium, a memory and a processor. The computer readable storage medium having computer executable instructions stored thereon for providing a sync notification to a client device. The processor is configured for executing the computer executable instructions stored in the memory to perform receiving a notification that an event of interest has been received. In addition, device in response to receiving the notification, the processor executes computer-executable instructions for determining a state of the client device. The state indicating whether or not the device has an outstanding sync notification, such that the state is determined based on a first parameter and a second parameter. Further, in response to the state of the client device indicating that the client device has no outstanding sync notifications prior to the receipt of the received event notification the processor the processor executes computer-executable instructions for setting the first parameter equal to the second parameter, such that the second parameter is updated after each successful device synchronization of the client device. The processor also executes computer-executable instructions for receiving a device/user configuration file having at least one of the first parameter and the second parameter. The device/user configuration file having a filter. In addition, processor also executes computer-executable instructions for reading the at least one of the first parameter and the second parameter from the device/user configuration file, and applying a filter to the sync notification prior to sending the sync notification to the client device for determining when to send the sync notification.

Additional features and advantages of embodiments of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
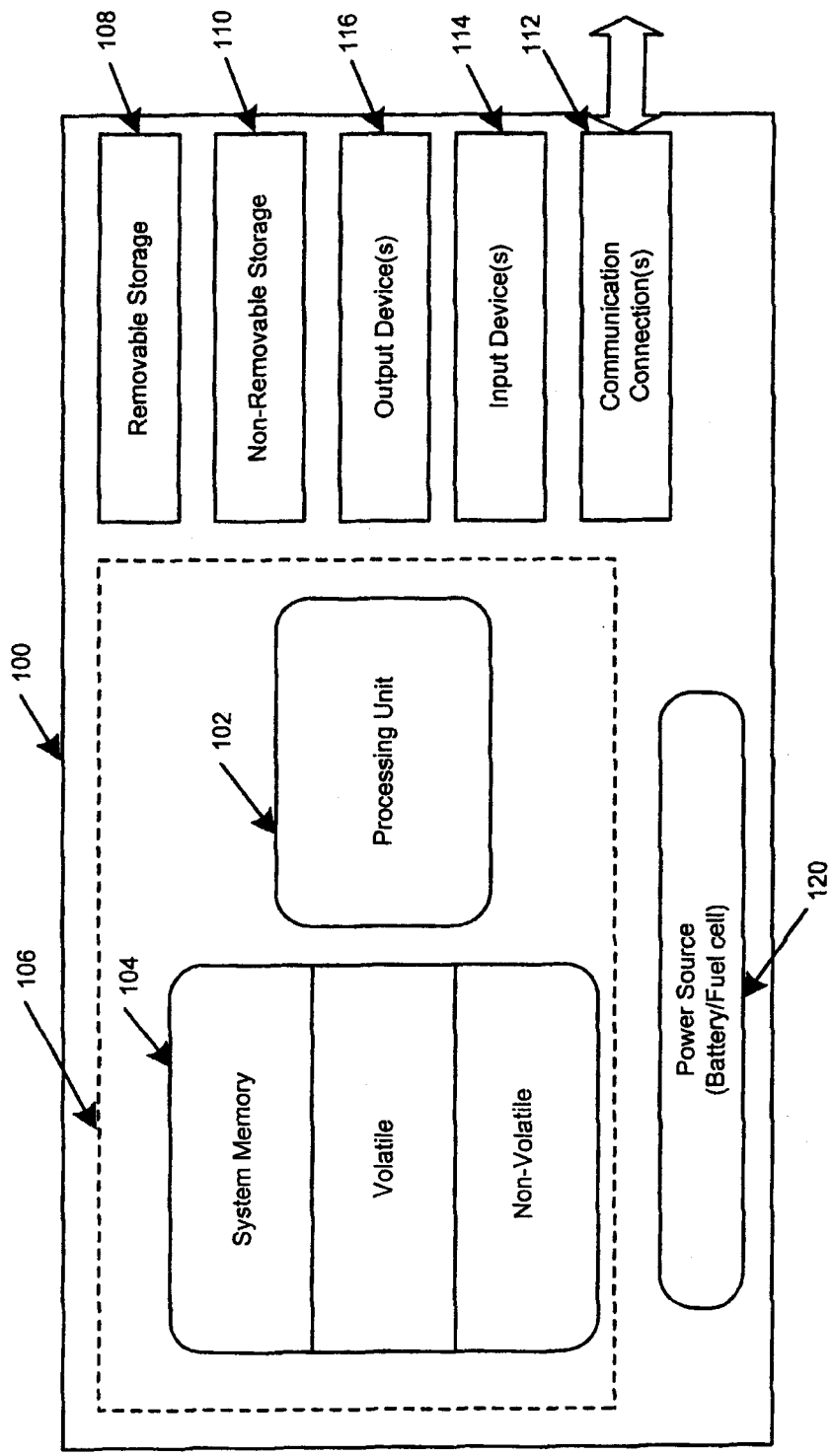
FIG. 1 is a block diagram generally illustrating an exemplary computer system on which the present invention resides.

Aspects of the invention provide a process for notifying a user of events of interest via sync notifications if the user's device has not been synchronized with a server. And aspects of the invention maintain a notion of the state of the mobile device, indicating whether it is up to date or not from the perspective of the server. When an event occurs that is of interest to the mobile device, the server refers to the stored state to decide whether or not the device needs to be prompted to sync. The mobile device is prompted to sync if the server decides that the device needs to be prompted to sync. Using this approach, common scenarios such as a user turning off her mobile device for a few hours will require far fewer notifications to maintain the client. For example, a user turns off her mobile device for a few hours while she's out to lunch. During that period of time, she gets twenty-five e-mails. As soon as she turns her device back on, she'll receive one sync notification and her device will be up to date within minutes. Conventional notification systems would send twenty-five notifications or wait a period of time before sending out at least one notification.

Aspects of the invention may be implemented in a system employing various types of machines, including cell phones, hand-held devices, wireless surveillance devices, microprocessor-based programmable consumer electronics, and the like, using instructions, such as program modules, that are executed by a processor. Generally, program modules include routines, objects, components, data structures and the like that perform particular tasks or implement particular abstract data types. The term "program" includes one or more program modules.

Turning to the drawings, wherein like reference numerals refer to like elements, aspects of the invention are illustrated as being implemented in a suitable computing environment. Although not required, aspects of the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that embodiments of the invention may be practiced with other computer system configurations, including hand-held devices, multi-processor systems, microprocessor based or programmable consumer electronics, network PCs, mini-computers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

FIG. 1 shows an exemplary computing device 100 for implementing an embodiment of the invention. In its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. This most basic configuration is illustrated in FIG. 1 by a dashed line 106. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 108 and a non-removable storage 110. Computer storage media includes volatile and nonvolatile, removable and non-removable media implemented in any method or technology for storage of information such as computer readable instructions, data structures, program modules or other data. The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

The device 100 may also contain one or more communications connections 112 that allow the device to communicate with other devices. The communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

The device 100 may also have one or more input devices 114 such as keyboard, mouse, pen, voice input device, touch-input device, etc. One or more output devices 116 such as a display, speakers, printer, etc. may also be included. All these devices are well known in the art and need not be discussed at greater length here.

The device 100 is configured as a mobile device. While the device 100 is configured as a mobile device, those skilled in the art will recognize that the device does not have to be a mobile device; it can be a desktop device. The device 100 is provided with a portable power source 120, such as a battery pack, a fuel cell, or the like. The power source 120 provides power for computations and wireless data transmissions by the device 100. It should be noted that the power source 120 might further include an external power source that overrides or recharges the built-in batteries/fuel cell, such as an AC adapter or a powered docking cradle for connection to a wired network. The mobile device 100 may further include a network interface card (NIC) for wirelessly communicating with different types of wireless networks. The NIC includes a transmitter, which is coupled to an antenna for transmitting data wirelessly over a suitable frequency channel. A receiver is also coupled to the antenna for receiving communication packets wirelessly transmitted from the networks with which the device is communicating. The network interface module card and the antenna are part of the communication connections 112. It will be appreciated that the interface type and physical configuration of the network interface module is not critical to the invention. For instance, the interface type could be PCI or another type and the network interface module does not have to reside on a separate card. It may be included on the motherboard of the computer or even possibly built into the processor in the future.

Through the wireless network interface module, the mobile device 100 may communicate with different types of wireless networks. For instance, the mobile device 100 may be connected wirelessly to an infrastructure network through an access point thereof. The mobile device 100 may also be part of a peer-to-peer network, also referred to as an ad hoc network, which includes other wireless devices.

In the description that follows, aspects of the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while aspects of the invention are being described in the foregoing context, it is not meant to be limiting as those of skill in the art will appreciate that various of the acts and operation described hereinafter may also be implemented in hardware.

Figure 2:
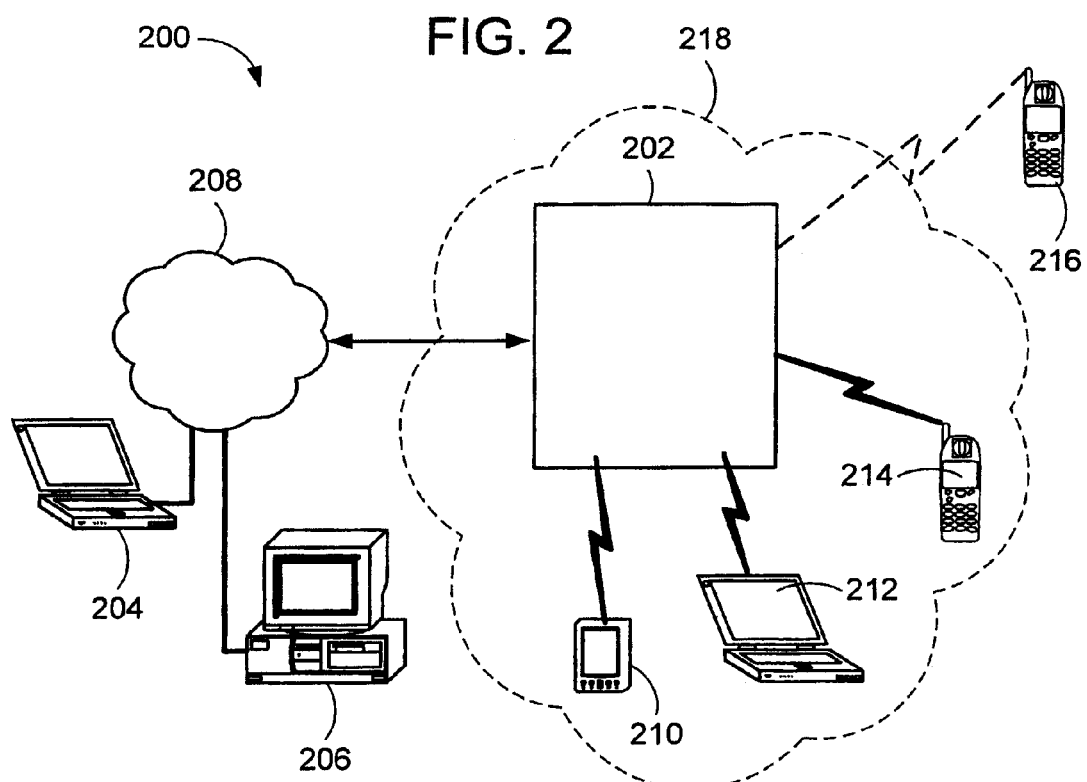
FIG. 2 is a block diagram generally illustrating an exemplary environment in which the present invention may operate.

An exemplary environment 200 in which the invention operates is shown in FIG. 2. An Exchange e-mail server 202 shall be used to describe an embodiment of the invention. Exchange is an e-mail server produced by Microsoft Corporation. While Exchange will be used, alternative embodiments of the invention may be used with other messaging servers, including instant message servers. The Exchange server 202 communicates with devices 204, 206 on a wired network 208 and devices 210-216 in range of wireless network 218. As shown in FIG. 2, mobile device 216 is not in range of network 218.

Figure 3:
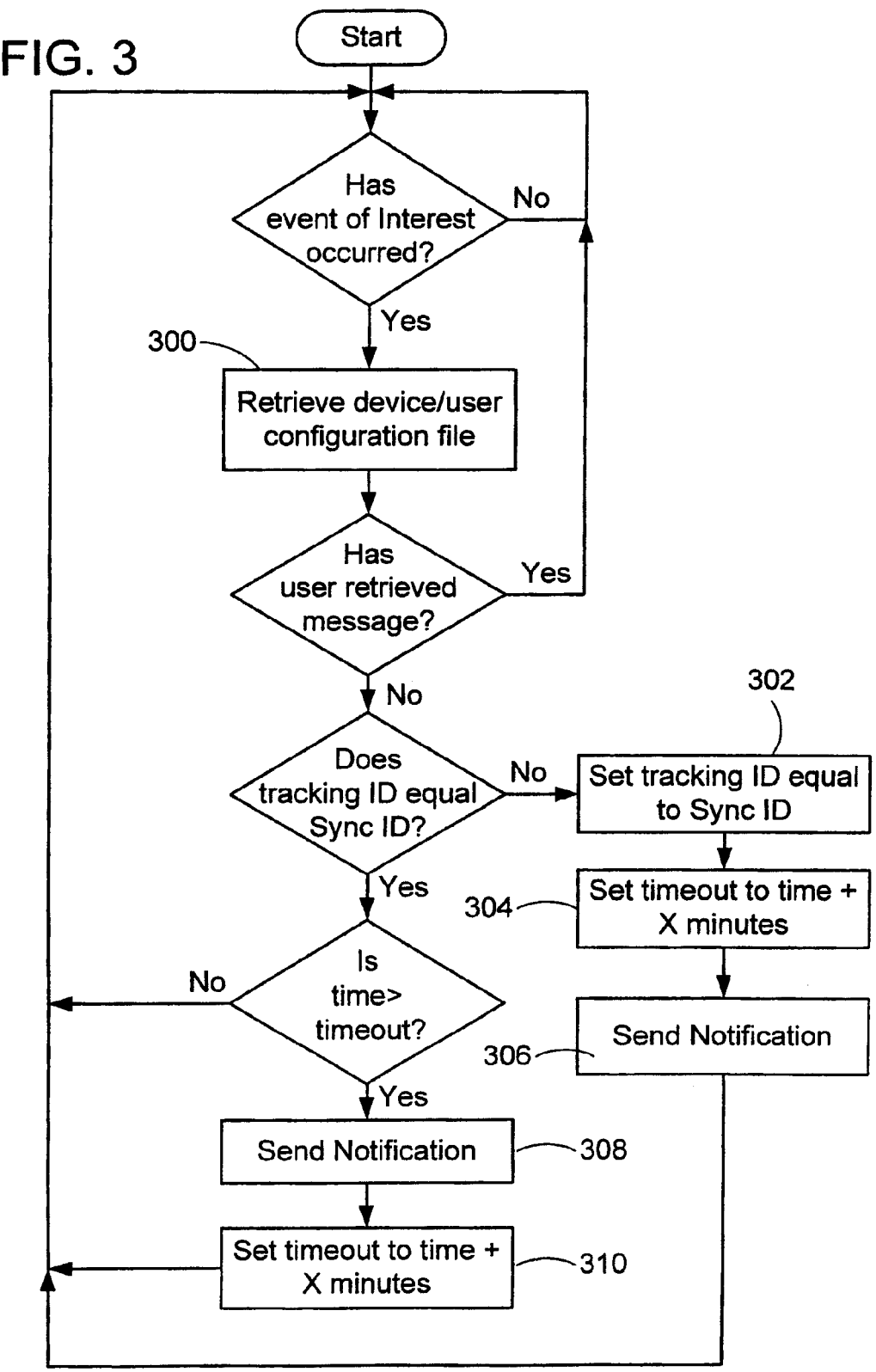
FIG. 3 is a flow chart illustrating a process for providing a sync notification to a client.

Turning now to FIG. 3, the server 202 detects when an event of interest for a user has occurred. The event of interest can be an e-mail arriving, a new or edited calendar item, a response to an inquiry, a traffic update, a weather update, instant messaging, etc. The device/user configuration file is retrieved for the user (step 300). The device/user configuration file has the phone number (if applicable), user name, and other particulars about the user. In the device/configuration file is a parameter that provides a representation of the state of the device and it provides an indication of whether an event of interest renders the device no longer up to date from the perspective of the server or whether an event of interest occurs and the server has not been contacted by the device for a certain period of time.

The device is up-to-date when, to the server's knowledge, the device is completely in sync with the server (with the possible exception of the event which just triggered a sync notification as described below). The device is pending synchronization when a sync notification has been sent to the device telling it to sync with the server, but the device has not yet performed synchronization. The parameter that can be used is called a syncGUID, which is used primarily to prevent spoofing/replay attacks. The syncGUID happens to have the same semantics. The syncGUID for a device is updated after each successful device synchronization with the server. The device/user configuration file contains the syncGUID or a link to the syncGUID. As used herein, the syncGUID shall be used to designate a parameter that provides a representation of the state of the device and it provides an indication of whether an event of interest renders the device no longer up to date from the perspective of the server or whether an event of interest occurs and the server has not been contacted by the device for a certain period of time.

The server maintains an in memory table of "last-known" syncGUIDs for each device, which for purposes of explanation shall be called a trackingGUID. If the syncGUID matches the trackingGUID for a given device, it can be concluded that the device has not performed a synchronization since the last event/notification was processed. This means that the device is in the pending synchronization state. If the GUIDs don't match, we conclude that the device has performed a sync since the last event/notification was processed, indicating that it is in the up-to-date state prior to the event that just triggered the notification.

The server checks to see if the user has retrieved the message. If the user has retrieved the message, no sync notification is sent. If the user has not retrieved the message, the following steps are performed. For each device listed in the user's configuration file, the trackingGUID is compared to the syncGUID. If the trackingGUID is not equal to the syncGUID, the trackingGUID is set equal to the syncGUID (step 302). The timeout value is set to the current time plus X minutes (step 304). X minutes is a parameter set by the server and in one embodiment, is typically set based on the confidence level of the network 208, 218. For example, if a network is not reliable and a message gets dropped, the X parameter is how long to wait to retry sending the notification to the device. The value of the X parameter can be set to any value. A value of one to two hours is sufficient for many networks while a value of fifteen minutes is needed for other networks. Once the timeout value is set, the sync notification is sent to the device (step 306).

If the trackingGUID is equal to the syncGUID, the current time is compared to the timeout time. If the time is less than the timeout value, no sync notification is sent. If the time is greater than the timeout value, a sync notification is sent (step 308) and a new timeout value is set (step 310). The timeout value is set by setting the timeout value to the current time plus X minutes as described above. Note that while FIG. 3 shows waiting for another event to occur if the time is less than the timeout value, an alternate approach is to determine if the user has retrieved the message when the time is greater than or equal to the timeout value and then perform steps 308 and 310 if the user has not retrieved the message during the interim time.

Figure 4:
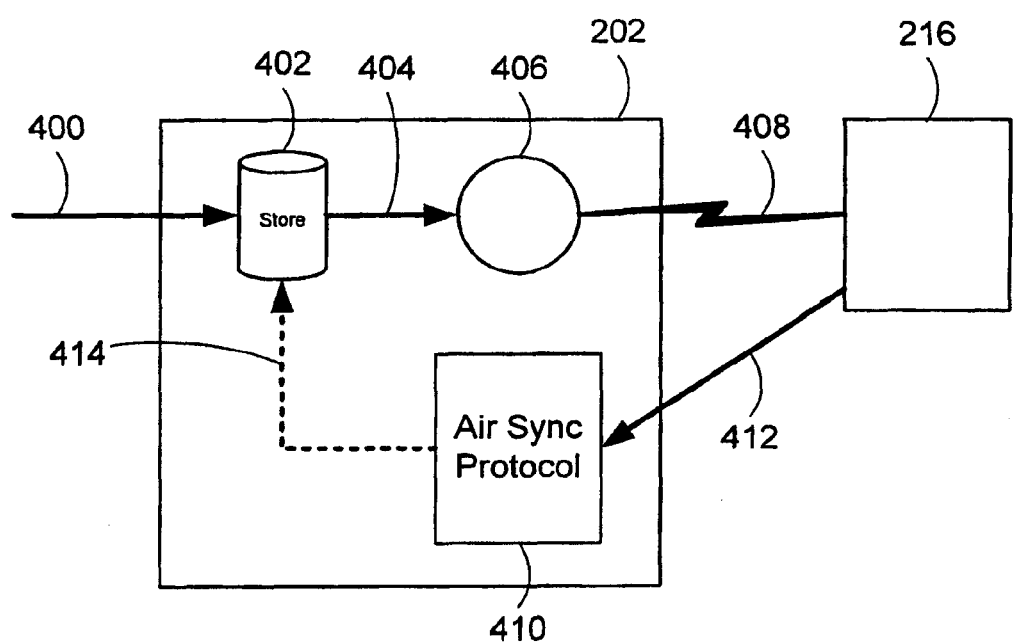
FIG. 4 is a block diagram illustrating the communication flow of the process of FIG. 3 in the environment of FIG. 2.

Turning now to FIG. 4, an implementation of the process is shown using the Exchange server 202 and device 216 of FIG. 2. An event of interest such as an email arrives at the server 202 and put in the store 402. The store represents any information store that supports eventing. The arrival of the event creates a trigger 404 that is sent to module 406. The module 406 performs the process of steps 300 to 310 after receiving the trigger 404. If applicable, a sync notification 408 is sent to device 216 via SMS. Following the process of steps 300 to 310, notifications 408 are sent to device 216 until the device 216 syncs. The Exchange server 202 has an air sync protocol 410 that devices (e.g., pocket PCs and phones) talk to in order to retrieve data from the store 402 that the devices and module 406 read from and write to in order to send and retrieve data. Once the device 216 syncs with the server as represented by line 412, the error sync protocol updates the syncGUID to the device/user configuration file as represented by line 414.

The type of sync notification may be a text message or it can be based on the device type. If a device supports image rendering, the sync notification can take the form of a graphical image or a text image while a device that supports only text rendering would only receive text based sync notifications. For example, if the event of interest is a daily summary of a user's calendar, a graphical image of the summary is sent if the device supports graphical rendering. A text summary is sent if the device only supports text rendering.

In one embodiment, user settable filters are used to determine when the sync notification is to be sent. These filters can be set up to send certain types of notifications right away and other types after the next timeout event, send notifications only during business hours or only during off-hours, and the like. Module 406 sends the sync notifications in accordance with the filter settings. The filter settings can be stored in the device/user configuration file or in a separate file.

It can be seen from the foregoing that a method to provide sync notifications to a device has been described. Aspects of the invention maintain a notion of the state of the device. When an event of interest occurs for the mobile device, the server decides whether or not the device needs to be prompted to sync. The device is prompted to sync if the server decides that the device needs to be prompted to sync. This method makes more efficient use of network resources than conventional systems and provides lower end user cost without introducing additional latency into the system.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, aspects of the invention as described herein contemplate all such embodiments as may come within the scope of the following claims and equivalents thereof.

What is claimed is:

1. A method to provide a sync notification to a client device comprising:
    receiving, by a server, an event notification that an event of interest has been received;
    in response to the server receiving the notification, determining a state of the client device, said state indicating whether or not the client device has an outstanding sync notification, said state being determined based on a first parameter and a second parameter;
    in response to the state of the client device indicating that the client device has no outstanding sync notifications prior to the receipt of the received event notification, setting the first parameter equal to the second parameter, wherein the second parameter is updated after each successful device synchronization of the client device;
    applying a filter to the sync notification prior to sending the sync notification to the client device, wherein sending the sync notification to the client device comprises one of the following actions as selected by the applied filter:
        sending the sync notification immediately,
        sending the sync notification after a next timeout event when the first parameter equals the second parameter and setting the timeout equal to the current time plus the predetermined value, and
        sending the sync notification during a specific time period.

2. The method of claim 1 further comprising determining a format of the sync notification as a function of a device type of the client device, and wherein sending the sync notification to the client device comprises sending the sync notification to the client device in the determined format.

3. The method of claim 2, wherein the determined format of the sync notification is one or more of the following: a text message, a graphical image, and a text image.

4. The method of claim 1, wherein the filter selects one of said actions based on a type of the sync notification.

5. The method of claim 1 further comprising, in response to the state of the client device indicating that the client device has at least one outstanding sync notification:
    not sending the sync notification to the client device when the current time is less than a timeout value, said timeout value being used to determine the maximum time between sync notifications; and
    sending the sync notification to the client device when the current time is greater than the timeout value.

6. The method of claim 1, wherein sending the sync notification comprises sending the sync notification using the SMTP (simple mail transfer protocol) protocol.

7. The method of claim 1 wherein receiving the notification comprises receiving a trigger event.

8. The method of claim 1, wherein the first parameter comprises a trackingGUID.

9. The method of claim 1, wherein the second parameter comprises a syncGUID.

10. A system comprising:
    at least one computer readable storage device having computer executable instructions stored thereon for providing a sync notification to a client device;
    a memory; and
    a processor configured for executing the computer executable instructions stored in the memory to perform:
        receiving a notification that an event of interest has been received;
        in response to receiving the notification, determining a state of the client device, said state indicating whether or not the device has an outstanding sync notification, said state being determined based on a first parameter and a second parameter;
        in response to the state of the client device indicating that the client device has no outstanding sync notifications prior to the receipt of the received event notification, setting the first parameter equal to the second parameter, wherein the second parameter is updated after each successful device synchronization of the client device;
        receiving a configuration file from a device or from a user, the configuration file having at least one of the first parameter and the second parameter, the configuration file having a filter;

reading the at least one of the first parameter and the second parameter from the configuration file; and applying the filter to the sync notification prior to sending the sync notification to the client device for determining when to send the sync notification;

wherein the processor is further configured for executing computer-executable instructions for, in response to the state of the client device indicating that the client device has at least one outstanding sync notification:

not sending the sync notification to the client device when the current time is less than the timeout, said timeout being used to determine the maximum time between sync notifications;

sending the sync notification to the client device when the current time is greater than the timeout and when the first parameter equals the second parameter; and setting the timeout equal to the current time plus the predetermined value.

11. The system of claim 10, wherein the processor is further configured for executing computer executable instructions for sending the sync notification to the client device, said sending comprising one of the following actions as selected by the applied filter:

sending the sync notification immediately, sending the sync notification after a next timeout event, and sending the sync notification during a specific time period.

12. The system of claim 10, wherein the processor is further configured for executing computer executable instructions for, in response to the state of the client device indicating that the client device has no outstanding sync notifications prior to the receipt the received event notification:

setting the first parameter equal to the second parameter, wherein the second parameter is updated after each successful device synchronization of the client device;

setting a timeout equal to a current time plus a predetermined value; and sending the sync notification to the client device.

13. The system of claim 10, wherein the processor is further configured for executing computer executable instructions for:

determining a format of the sync notification as a function of a device type of the client device; and sending the sync notification to the client device in the determined format, wherein the determined format of the sync notification is one or more of the following: a text message, a graphical image, and a text image.

14. The system of claim 10, wherein the first parameter comprises a trackingGUID.

15. The system of claim 10, wherein the second parameter comprises a syncGUID.

16. A method to provide a sync notification to a client device comprising:

receiving, by a server, an event notification that an event of interest has been received;

in response to the server receiving the notification, determining a state of the client device, said state indicating whether or not the client device has an outstanding sync notification, said state being determined based on a trackingGUID and a syncGUID;

in response to the state of the client device indicating that the client device has no outstanding sync notifications prior to the receipt of the received event notification, setting the trackingGUID equal to the syncGUID, wherein the syncGUID is updated after each successful device synchronization of the client device;

applying a filter to the sync notification prior to sending the sync notification to the client device, wherein sending the sync notification to the client device comprises one of the following actions as selected by the applied filter:

sending the sync notification immediately, sending the sync notification after a next timeout event, and sending the sync notification during a specific time period;

in response to the state of the client device indicating that the client device has at least one outstanding sync notification:

not sending the sync notification to the client device when the current time is less than a timeout value, said timeout value being used to determine the maximum time between sync notifications; and sending the sync notification to the client device when the current time is greater than the timeout value.

17. The method of claim 16 further comprising determining a format of the sync notification as a function of a device type of the client device, and wherein sending the sync notification to the client device comprises sending the sync notification to the client device in the determined format.

* * * * *